United States Patent [19]

Zboril

[11] 4,430,488

[45] Feb. 7, 1984

[54] DEACTIVATION OF CATALYST IN SOLUTION PROCESS FOR POLYMERIZATION OF α-OLEFINS

[75] Inventor: Vaclav G. Zboril, Kingston, Canada

[73] Assignee: Du Pont Canada Inc., Mississauga, Canada

[21] Appl. No.: 443,060

[22] Filed: Nov. 19, 1982

Related U.S. Application Data

[63] Continuation-in-part of Ser. No. 250,904, Apr. 3, 1981.

[30] Foreign Application Priority Data

Dec. 11, 1980 [GB] United Kingdom ............... 8039684

[51] Int. Cl.³ .................... C08F 2/42; C08F 10/02
[52] U.S. Cl. .................... 526/84; 524/398; 524/400; 528/485; 528/486
[58] Field of Search ............. 524/398, 400; 526/84; 528/485, 486

[56] References Cited

U.S. PATENT DOCUMENTS

| 2,978,442 | 4/1961 | Brighttrill et al. | 528/486 |
| 2,985,617 | 5/1961 | Salyer et al. | 524/400 |
| 3,520,866 | 7/1970 | Bacski | 526/84 |
| 4,105,609 | 8/1978 | Machon et al. | 528/486 |

FOREIGN PATENT DOCUMENTS

660869 4/1963 Canada .
732279 4/1966 Canada .

*Primary Examiner*—Edward J. Smith

[57] ABSTRACT

The present invention relates to a solution polymerization process for the preparation of high molecular weight polymers of α-olefins selected from the group consisting of homopolymers of ethylene and copolymers of ethylene and $C_3$–$C_{12}$ α-olefins. The process comprises feeding monomer, coordination catalyst containing vanadium and inert hydrocarbon solvent to a reactor, polymerizing the monomer at a temperature in the range of 105°–320° C. and a pressure of less than 25 MPa and deactivating the catalyst in the solution so obtained by admixing therewith a solution of a salt of an alkaline earth metal or zinc and an aliphatic monocarboxylic acid dissolved in hydrocarbon solvent. The hydrocarbon solvent is then separated from the resultant solution and a composition comprising high molecular weight polymer is recovered. Any catalyst residues remain with the polymer. A particular salt is the salt of a $C_8$ aliphatic acid, especially calcium 2-ethyl hexanoate.

7 Claims, No Drawings

DEACTIVATION OF CATALYST IN SOLUTION PROCESS FOR POLYMERIZATION OF α-OLEFINS

This application is a continuation-in-part of my application Ser. No. 250,904, filed Apr. 3, 1981.

BACKGROUND OF THE INVENTION

1. Field of the Invention

The present invention relates to a process for the polymerization of α-olefins and especially to the deactivation of the coordination catalyst used in a solution process for the polymerization of α-olefins. In particular the present invention relates to such deactivation wherein the coordination catalyst contains vanadium.

2. Description of the Prior Art

Polymers of ethylene, for example, homopolymers of ethylene and copolymers of ethylene and higher α-olefins, are used in large volumes for a wide variety of end uses, for example, in the form of film, fibres, moulded or thermoformed articles, pipe, coatings and the like.

Processes for the preparation of homopolymers of ethylene and copolymers of ethylene and higher α-olefins are known. Such processes include processes in which the monomers are polymerized in the presence of a coordination catalyst, for example, a catalyst comprising a compound of a transition metal belonging to Groups IVB–VIB of the Periodic Table and an organometallic compound of a metal belonging to Groups I–IIIA of the Periodic Table.

A particularly preferred process for the polymerization of α-olefins is the high temperature or "solution" polymerization process, an example of which is described in Canadian Pat. No. 660 869 of A. W. Anderson, E. L. Fallwell and J. M. Bruce, which issued Apr. 9, 1963. In a solution process the process parameters are selected in such a way that both the monomer and polymer are soluble in the reaction medium. Under such conditions accurate control over the degree of polymerization, and hence the molecular weight of the polymer obtained, may be achieved, for example, by control of the reaction temperature.

The polymerization reaction in a solution polymerization process is normally terminated by addition of a so-called "deactivator", for example, a fatty acid or an alcohol. The fatty acid is admixed with hydrocarbon solvent, normally the solvent of the polymerization process, and fed into the polymerization mixture, usually shortly after that mixture passes from the reactor. The polymerization mixture that has been treated with deactivator contains catalyst residues which may be removed by contacting the mixture with an adsorbent, for example, alumina. Such a deactivation and catalyst removal process is described in Canadian Pat. No. 732 279 of B. B. Baker, K. M. Brauner and A. N. Oemler, which issued Apr. 12, 1966.

A method for the deactivation of a coordination catalyst in a high pressure solvent-free process for the polymerization of α-olefins is disclosed in U.S. Pat. No. 4,105,609 of J-P. Machon, B. Levresse and P. Gloriod, issued Aug. 8, 1978. The method involves injecting into the polymerization reaction mixture an alkali or alkaline earth metal salt of a carboxylic acid e.g. sodium stearate, calcium stearate or sodium benzoate.

The stabilization of polyethylene by the addition of up to 5% by weight of a polyvinyl chloride stabilizer is disclosed by I. O. Salyer et al in U.S. Pat. No. 2,985,617, which issued May 23, 1961. The disclosed stabilizers include alkaline earth salts of fatty acids.

SUMMARY OF THE INVENTION

It has now been found that the catalyst in a solution polymerization process may be deactivated by contacting the polymerization mixture with a small amount of a solution of a salt of an alkaline earth metal or zinc and an aliphatic monocarboxylic acid dissolved in the hydrocarbon solvent used in the polymerization process.

Accordingly the present invention provides a solution polymerization process for the preparation of high molecular weight polymers of α-olefins selected from the group consisting of homopolymers of ethylene and copolymers of ethylene and $C_3$–$C_{12}$ α-olefins, said process comprising feeding monomer selected from the group consisting of ethylene and mixtures of ethylene and at least one $C_3$–$C_{12}$ α-olefin, a coordination catalyst and inert hydrocarbon solvent to a reactor, said catalyst containing vanadium, polymerizing said monomer at a temperature in the range of 105°–320° C. and a pressure of less than 25 MPa, deactivating the catalyst in the solution so obtained by admixing therewith a solution of a salt of an alkaline earth metal or zinc and an aliphatic monocarboxylic acid having 6 to 12 carbon atoms dissolved in hydrocarbon solvent, said solution containing sufficient excess aliphatic monocarboxylic acid to solubilize said salt, separating hydrocarbon solvent, aliphatic monocarboxylic acid and other volatile matter from the resultant solution and recovering a composition comprising said high molecular weight polymer, the amount of said salt being controlled so that the composition contains less than 5000 ppm of alkaline earth metal or zinc.

In a preferred embodiment of the process of the present invention the composition so obtained has less than 200 ppm of alkaline earth metal or zinc.

In a preferred embodiment the carboxylic acid is a $C_8$ carboxylic acid.

In another embodiment the alkaline earth metal is calcium.

DETAILED DESCRIPTION OF THE INVENTION

The present invention is directed to a solution polymerization process for the preparation of high molecular weight polymers of α-olefins. In particular the polymers of α-olefins are homopolymers of ethylene and copolymers of ethylene and higher α-olefins, especially such higher α-olefins having 3 to 12 carbon atoms, i.e., $C_3$–$C_{12}$ α-olefins including bicyclic α-olefins, examples of which are 1-butene, 1-hexene, 1-octene and bicyclo-(2,2,1)-2-heptene. In addition cyclic endomethylenic dienes may be fed to the process with the ethylene or mixtures of ethylene and $C_3$–$C_{12}$ α-olefin, as is described in Canadian Pat. No. 980498 of C. T. Elston, which issued Dec. 23, 1975.

In the solution polymerization process of the present invention α-olefin monomer, a coordination catalyst and inert hydrocarbon solvent are fed to a reactor. Coordination catalysts for solution polymerization processes are known, for example those described in the aforementioned Canadian Patent 660869 and in U.S. Pat. No. 4,311,816 of A. N. Mollison and V. G. Zboril, issued Jan. 19, 1982. The α-olefin monomer may be solely ethylene or a mixture of ethylene and one or more of the higher α-olefins.

Solution polymerization processes may be operated at temperatures in the range of 105°-320° C. and especially in the range 105°-310° C. The pressures used in the process of the present invention are those known for solution polymerization processes viz.less than 25 MPa and especially in the range of about 4-25 MPa. The pressure and temperature are controlled so that both the unreacted monomers and the polymer formed remain in solution.

The hydrocarbon solvent used in the polymerization process is a hydrocarbon solvent that is inert with respect to the coordination catalyst. Such solvents are known and include hexane, heptane, octane, cyclohexane, methylcyclohexane and hydrogenated naphtha. The solvent used in the polymerization process is preferably also used in the preparation of the coordination catalyst. The hydrocarbon solvent is the major component of the polymerization mixture fed to the reactor, usually comprising at least 80% of the reaction mixture. In the process the α-olefin is dissolved in the solvent.

The mixture that exits from the polymerization reactor comprises polymer, unreacted monomer, coordination catalyst some of which remains in an active state, and hydrocarbon solvent. A deactivator is added to the mixture to terminate the polymerization process. In the process of the present invention the deactivator is a solution of a salt of an alkaline earth metal or zinc and an aliphatic monocarboxylic acid dissolved in hydrocarbon solvent. In particular the hydrocarbon solvent used for the deactivator is the same as the solvent used in the polymerization process. If a different solvent is used, it must be compatible with the solvent used in the polymerization process, not cause precipitation of any component of the polymerization mixture and not cause adverse effects on the solvent recovery system associated with the polymerization process.

The salt of the deactivator solution must be dissolved in the solvent in order to obtain intimate contact between the deactivator and any remaining active catalyst and to obtain uniform dispersion of the deactivator and catalyst residues i.e., the form of the catalyst after deactivation, throughout the polymer, thereby facilitating the production of polymer of uniform properties.

In the salt of the deactivator solution, the metal is an alkaline earth metal or zinc, especially magnesium or calcium. The remainder of the salt is derived from one or more aliphatic carboxylic acids, especially such acids having 6 to 12 carbon atoms. In a preferred embodiment the acids have 8 to 12 carbon atoms. The acid is preferably a branched chain aliphatic acid although straight chain aliphatic acids and cycloaliphatic acids may be used. Moreover the acids may be saturated or unsaturated acids. However, the acid must be such that the salt thereof that is used in the process of the present invention may be solubilized in the hydrocarbon solvent used therein. In preferred embodiments the salt is calcium 2-ethyl hexanoate, calcium naphthenate, calcium tallate or the like.

The amount of deactivator used is in excess of the stoichiometric amount required to deactivate the catalyst. Moreover, the amount of deactivator used should be such that the resultant polymer contains less than 200 ppm and especially less than 160 ppm of the metal of the deactivator.

In the process of the present invention the deactivated polymerization mixture is fed to a separator, which may be a multistage separator, to separate unreacted monomer, hydrocarbon solvent, aliphatic monocarboxylic acid and any other volatile matter from the polymer. In contrast to the usual practice in a solution process, no steps are taken to remove catalyst residues and/or deactivator from the polymer using adsorbents or other techniques. In the present invention the deactivator remains with the polymer. It is important, especially with respect to the colour of the resultant polymer, that most of the free aliphatic monocarboxylic acid be removed from the polymer prior to the solidification of the polymer. Thus, the excess aliphatic monocarboxylic acid is important in the solubilization of the salt of the deactivator, but it is necessary to subsequently remove most of, and preferably substantially all of, the free acid from the polymer because of adverse effects of acid on polymer colour. After separation from solvent and unreacted monomer, the polymer may be extruded into water and cut into pellets or other suitable comminuted shapes. Pigments, antioxidants and other additives may be added to the polymer, especially immediately prior to the formation of the pellets or other comminuted shapes.

The polymer obtained according to the process of the present invention may be used in a wide variety of enduses, as is known for homopolymers of ethylene and copolymers of ethylene and higher α-olefins.

The use of the deactivation process of the present invention may result in a reduction in corrosion of those parts of the apparatus of the process that are located down-stream from the introduction of deactivator. The use of the deactivation process of the present invention may also result in the production of polymer of improved colour, from polymerization processes in which the coordination catalyst contains vanadium.

The present invention is illustrated by the following examples.

EXAMPLE I

A polymerization catalyst was prepared by in-line mixing a solution containing 0.36 mmol/l of titanium tetrachloride and 1.44 mmol/l of vanadium oxytrichloride in cyclohexane with a 3.6 mmol/l solution of isoprenyl aluminum in cyclohexane. The catalyst was fed to a continuous 70 ml stirred polymerization reactor. A solution containing about 3% ethylene in cyclohexane was also fed to the reactor. The ethylene was polymerized in the reactor which was operated under solution polymerization conditions. The ratio of aluminum to the sum of titanium and vanadium, on an atomic basis, in the catalyst was adjusted so as to achieve the optimum conversion of ethylene to polymer; that ratio was in the range 1.4-2.0. The reactor was operated at a temperature of 200° C., a pressure of 7.5 MPa, a space velocity of 0.36 min$^{-1}$, a conversion of ethylene to polymer of greater than 80%, a combined concentration of titanium and vanadium, atomic basis, of 0.3-0.4 mmol/l and a concentration of aluminum, atomic basis, of 0.5-0.8 mmole/l.

A deactivator was continuously added to the reaction mixture shortly after it passed from the reactor. The pressure of the deactivated reaction mixture was then reduced to 110 KPa by means of a needle valve made of stainless steel. The polymer slurry thus obtained was cooled to ambient temperature and subjected to a Waring ® blender for about 30 seconds. The polymer, including deactivator, was separated from the solvent by filtration, dried at room temperature in the dark and pressed at about 190° C. into plaques measuring about 2 mm in thickness.

The colour of the plaques was rated visually on a scale of 0–5, the former representing colourless. The hue of the colour was also noted.

The results obtained for three different deactivators were as follows:

TABLE I

| Run No. | Deactivator Type | Amount* | Polymer Colour Rating | Hue |
|---|---|---|---|---|
| 1 | Acetylacetone in 2-butanol | 55/50 000 | 5 | green |
| 2 | Capric acid in 2-butanol | 55/50 000 | 4 | brown, aging to green |
| 3 | Calcium 2-ethyl hexanoate | 38 | 2 | beige |

*g of deactivator per g of combined amount of titanium and vanadium (as metals).

EXAMPLE II

A number of polymers were prepared using the procedure of Run 1 of Example I. After about 150 hours of operation of the continuous reactor, the pressure-reducing needle valve was corroded to such an extent that the valve malfunctioned. When examined under a microscope extensive corrosion was noted, especially on the seat of the valve.

EXAMPLE III

A number of polymers were prepared using the procedure of Run 3 of Example I. After operating the polymerization unit for about 2000 hours, an inspection showed no significant corrosion of the pressure-reducing needle valve.

EXAMPLE IV

A thick-walled glass tube measuring approximately 14 cm in length and 2.5 cm in diameter was charged, under an atmosphere of nitrogen, with separate solutions of titanium tetrachloride, vanadium oxytrichloride and isoprenyl aluminum, each in decalin solvent, so that the tube contained 0.006 mmol of titanium tetrachloride, 0.024 mmol of vanadium oxytrichloride and 0.053 mmol of isoprenyl aluminum. In addition 0.026 mmoles of each of acetylacetone and of pelargonic acid, in decalin solvent, were charged to the tube. Additional decalin was added to bring the total volume in the tube to 10 ml. The tube was then sealed under vacuum. The sealed tube was immersed in a silicone oil bath at 300° C. for 15 minutes, briefly inspected visually, and heated at 300° C. for a further 15 minutes. The contents of the tube, on cooling, were bright yellow in colour; a small amount of a light coloured precipitate was also present. After exposure to air for several days the contents of the tube had turned a green colour and a precipitate of green solids had formed.

EXAMPLE V

The procedure of Example IV was repeated except that the acetylacetone and pelargonic acid were replaced with 0.415 mmoles of pelargonic acid.

After heating at 300° C. for 30 minutes, the contents of the tube were, on cooling, faintly straw yellow in colour. After exposure to air for about one week, a heavy bright green precipitate had formed.

EXAMPLE VI

The procedure of Example IV was repeated except that the acetylacetone and pelargonic acid were replaced with 0.418 mmoles of calcium 2-ethyl hexanoate.

After heating at 300° C. for 30 minutes, the contents of the tube were, on cooling, faintly straw yellow in colour with a darker "gummy" residue at the base of the tube. After exposure to air for several weeks no colour change was apparent.

Examples IV–VI indicate that the use of a catalyst deactivator of the present invention viz. calcium 2-ethyl hexanoate, is less susceptible to colour formation with the catalyst system used than the use of acetylacetone and/or pelargonic acid deactivators.

EXAMPLE VII

A coordination catalyst was prepared by in-line mixing a solution of titanium tetrachloride/vanadium oxytrichloride (20/80, molar basis) in cyclohexane with a solution of triethyl aluminum in cyclohexane and injecting the resultant catalyst into a stirred reactor of a polymerization process. Solutions of ethylene and butene-1 in cyclohexane were also injected into the reactor. The polymerization conditions were adjusted so that the resultant ethylene/butene-1 copolymer had a density of 0.945 g/cm$^3$.

At the exit of the polymerization reactor, a solution of $C_8$–$C_{10}$ fatty acids in cyclohexane was injected into the reaction mixture. The resultant mixture was then heated to 310° C. and a solution of acetyl acetone in cyclohexane injected into the mixture. The molar ratio of the two deactivators to the sum of the catalyst metals, i.e, Ti+V+Al, was 3.8 and 2.8 respectively. The deactivated solution was contacted with alumina to adsorb the deactivators and catalyst metals. A solution of an antioxidant (Irganox ® 1010) was injected into the polymer solution and then the solvent and other volatile matter were flashed off from the polymer solution. The polymer was recovered in the form of pellets.

The polymer obtained was tested for corrosivity to brass, metals content and colour, the latter being measured on a Hunter L,a,b, laboratory colourimeter. The induction period at 200° C. in a melt oxidative stability test, as described by J. D. Trizisky in U.S. Pat. No. 4,120,660 which issued Oct. 17, 1978 was measured shortly after the polymer was manufactured and again after a period of one year.

The results for two polymers differing in vanadium content in this comparative example are given in Table II.

EXAMPLE VIII

The procedure of Example VII was repeated except that the fatty acid deactivator was replaced with a solution of calcium 2-ethylhexanoate and the acetyl acetone deactivator was omitted. The ratio of the calcium to the sum of the catalyst metals was 2.2. The deactivated solution was not contacted with an alumina adsorber. More than 90% of the free 2-ethylhexanoic acid derived from the deactivator was flashed off with the hydrocarbon solvent and other volatile matter.

The results are given in TABLE II.

EXAMPLE IX

The procedure of Example VIII was repeated except that the catalyst was prepared by admixing in-line a solution of titanium tetrachloride/vanadium oxytrichloride (85/15, molar basis) with a solution of diethyl aluminum chloride. After about one minute, the resultant solution was rapidly admixed with a stream of cyclohexane at a temperature of 300° C.; the solution obtained had a temperature of 220° C. and, after a further minute, it was fed to a polymerization reactor together with a solution of triethyl aluminum. The ratio of calcium in the deactivator to the sum of the catalyst metals was 3.66.

The results obtained are given in TABLE II.

TABLE II

| Example | VII(A) | VII(B) | VIII | IX |
|---|---|---|---|---|
| Cl in polymer (ppm) | 5 | 5 | 35 | 100 |
| Ti/V in polymer (ppm) | NA*/0.3 | NA*/1.66 | 4.6/18.2 | 30/6 |
| Ca in polymer (ppm) | 0 | 0 | 38 | 195 |
| Colour | | | | |
| L | NA | NA | 74 | 78 |
| a | NA | NA | −2.2 | −1.6 |
| b | NA | NA | 4.0 | 8.1 |
| Retention of Oxidative Stability after 1 year (%) | 80 | 50 | 80 | 100 |
| Corrosivity | Nil | Nil | Nil | Nil |

NB: NA = Not Available, *typically ~ 1 ppm

Examples VII-IX indicate that the polymer with a high vanadium content (Example VIII) was less yellow, as measured by "b" in the colour measurements, then polymer with a lower vanadium but higher titanium content Example IX). It would seem that the calcium 2-ethyl hexanoate deactivator had reduced or eliminated the tendency for vanadium residues to cause colour in the polymer. In addition, the polymer containing calcium 2-ethyl hexanoate showed improved retention of oxidative stability.

EXAMPLE X

A polymerization catalyst was prepared by admixing a solution of titanium tetrachloride and vanadium oxytrichloride, at a mole ratio of 85:15 and a concentration of 4 mmole/liter in cyclohexane, with a solution of diethyl aluminum chloride, at a concentration of 4 mmole/liter, in cyclohexane at 25° C. After a hold-up time of 30 seconds, the resultant mixture was admixed with hot (310° C.) cyclohexane to give a solution having a temperature of 220° C. After a hold-up time of 1.5 minutes, the catalyst solution was fed to a reactor together with a 3% solution of ethylene in cyclohexane and a solution of triethyl aluminum (8 mmole/liter) in cyclohexane. The temperature in the reactor was 240° C. and the space velocity, a measure of hold-up time, was 0.37 min⁻¹. The polymerization mixture leaving the reactor was deactivated after a period of 30 seconds during which period the temperature of the mixture reached 280° C. The deactivator was a metal/acid salt in cyclohexane. The deactivated solution was maintained at 310° C. for 2.5 minutes, cooled to and maintained at 240° C. for 5 minutes and then cooled to and maintained at 130° C. for 4 minutes. The cyclohexane was then flashed off from the cooled solution and the polymer obtained was treated with steam for 8 hours, dried with hot air at 80° C., melted and pressed into plaques having a thickness of 5 mm.

The colour of the plaques was measured using a Hunter laboratory colourimeter equipped with a 1 inch aperature. A colour rating was calculated using the formula:

$$\text{Colour Rating} = L - \frac{400b}{L}$$

where L and b are measured on the colourimeter.

A number of metal/acid deactivators were tested and the results obtained are given in TABLE III.

TABLE III

| Run No. | Deactivator Type | Amount (mmole/liter) | Soluble in ** Cyclohexane | Colour Rating |
|---|---|---|---|---|
| 1 | Calcium 2-ethyl hexanoate | 0.95 | yes | 4.9 |
| 2 | Calcium Stearate | 1.07 | no | −33 |
| 3 | Calcium Stearate | 2.14 | no | −32 |
| 4 | Magnesium Pelargonate | 1.14 | yes | 0.7 |
| 5 | Magnesium Pelargonate | 1.82 | yes | 5.8 |
| 6 | Calcium Caprylate | 1.05 | yes | 12.1 |
| 7 | Calcium Neodecanoate | 1.05 | yes | −18 |
| 8 | Sodium Benzoate | 1.05 | no | −10.8 |

*(1) The deactivators of Runs 2, 3, and 8 are not within the scope of the present invention.
(2) The "Amount" shown is the concentration in the reactor and is in excess of the stoichiometric amount for deactivation of the catalyst.
(3) The calcium caprylate, magnesium pelargonate and calcium 2-ethyl hexanoate contained approximately 60%, 40% and 5% excess acid, respectively.
(4) The amount of deactivator metal in the polymer was less than 5000 ppm in all instances, the high level of deactivator metal being due to the high concentration of deactivator used in the runs.
(5) The slurry of sodium benzoate/cyclohexane contained 0.75% by weight of polyisobutylene as a viscosity modifier.
**YES = deactivator completely soluble in cyclohexane under the conditions used
NO = deactivator not completely soluble, used in the form of a slurry.

The results show that the deactivators of Runs 1, 4, 5, and 6 gave polymers with higher values of Colour Rating, and thus polymer of more acceptable colour, than the deactivators of Runs 2, 3 and 8.

The deactivator of Run 7 gave polymer with a poor colour rating. It is believed that the deactivator as purchased contained hexylene glycol as solubilizing agent. Moreover, the deactivator was basic in nature, i.e., there was no excess acid in the deactivator. The poor Colour Rating is believed, in view of the processing temperatures used, to be related to the presence of hexylene glycol and to the basic nature of the deactivator.

The embodiments of the invention in which an exclusive property or privilege is claimed are defined as follows:

1. A solution polymerization process for the preparation of high molecular weight polymers of α-olefins selected from the group consisting of homopolymers of ethylene and copolymers of ethylene and $C_3$–$C_{12}$ α-olefins, said process comprising feeding monomer selected from the group consisting of ethylene and mixtures of ethylene and at least one $C_3$–$C_{12}$ α-olefin, a coordination catalyst and inert hydrocarbon solvent to a reactor, said catalyst containing vanadium, polymerizing said monomer at a temperature in the range of 105°–320° C. and a pressure of less than 25 MPa, deactivating the catalyst in the solution so obtained by admixing therewith a solution of a salt of an alkaline earth metal or zinc and an aliphatic monocarboxylic acid having 6 to 12 carbon atoms dissolved in hydrocarbon solvent, said solution containing sufficient excess aliphatic monocarboxylic acid to solubilize said salt, separating hydrocarbon solvent, aliphatic monocarboxylic acid and other volatile matter from the resultant solution and recovering a composition comprising said high molecular weight polymer, the amount of said salt being controlled so that the composition contains less than 5000 ppm of alkaline earth metal or zinc.

2. The process of claim 1 in which the resultant composition contains less than 200 ppm of alkaline earth metal or zinc.

3. The process of claim 2 in which the aliphatic monocarboxylic acid has 8 to 12 carbon atoms.

4. The process of claim 2 in which the salt is a calcium salt.

5. The process of claim 4 in which the aliphatic monocarboxylic acid is a $C_8$ aliphatic acid.

6. The process of claim 4 in which the salt is calcium 2-ethyl hexanoate.

7. The process of claim 2 in which the hydrocarbon solvent of the salt solution is the same as that fed to the reactor.

* * * * *